UNITED STATES PATENT OFFICE.

EDWARD GOODRICH ACHESON, OF NIAGARA FALLS, NEW YORK.

SILOXICON-COATED CARBON-CONTAINING ARTICLE.

No. 895,531.     Specification of Letters Patent.     Patented Aug. 11, 1908.

Application filed July 2, 1906. Serial No. 324,502.

*To all whom it may concern:*

Be it known that I, EDWARD GOODRICH ACHESON, a citizen of the United States, residing at Niagara Falls, Niagara county, State of New York, have invented certain new and useful Improvements in Siloxicon-Coated Carbon-Containing Articles, of which the following is a specification.

My invention relates to a new article of manufacture which I have described as a siloxicon-coated carbon-containing article, and it has for its object to provide such an article so coated, whereby it will combine the characteristics and properties of the various materials entering therein to produce new and useful results, and to these ends my invention consists in an article embodying characteristics hereinafter stated.

In my Patent No. 722,793, dated March 17, 1903, I have described and claimed a new refractory material designated "siloxicon", and the characteristics of this material are well known.

One of the objects of my present invention is to utilize the characteristics and advantages of siloxicon in connection with other materials, and more especially in connection with articles or bodies of carbon, whereby I produce a new article of manufacture, and am enabled to utilize the advantageous features and characteristics of both materials and produce new and improved results.

In using the term carbon-containing article, I use it in its broadest sense to include articles not only made of carbon in its different forms, but articles in which carbon is a material ingredient. The general characteristic of such carbon articles, among which may be mentioned electrodes, crucibles, twyers, brick, muffles, and similar articles, are known and the advantages and disadvantages of the use of such articles have been recognized to a greater or less extent; and among these, it is known, that while they are refractory to a certain degree, they are liable to injury or destruction under certain conditions, as for instance, when exposed to high temperatures in the presence of oxygen or when exposed to molten metals in various electro-chemical or metallurgical processes, and in numerous other relations, well understood by those skilled in the art. I am enabled to produce carbon articles which, while retaining the well known advantages and characteristics of such articles, also embody the characteristics and advantages of siloxicon, so that the articles may be used under conditions and relations wherein it is impracticable to utilize carbon articles. The articles are coated or protected with the highly refractory siloxicon which tends to prolong the life of such articles and to prevent disintegration or destruction thereof, as well as to enable their use to better advantage in other respects. It will be apparent that by my process there will be no sharp line of division between the coating and the carbon core, and that the coating will decrementally merge into the core.

The carbon articles may be coated with siloxicon throughout their whole extent, or throughout any portion of their surface inside or out, for instance, in making crucibles, or certain portions thereof as in making twyers, and certain surfaces in making brick and the like, and the coating of siloxicon can be of any desired thickness requisite to produce the desired effects.

While various methods of manufacture of the articles may be employed, I prefer to utilize a portion of the carbon of the articles themselves in producing the siloxicon coating, as in this way a practically homogeneous article is produced, consisting partly of the carbon body covered with what may be termed an integral coating of siloxicon. In doing this, the carbon article may be first formed into the desired shape and condition, and then it is subjected to the action of silica under the influence of heat in such a way that silicon and oxygen combines with the carbon to form a permanent coating of siloxicon upon the body of the article. One way of accomplishing this is by the use of amorphous carbon which may be mixed with a suitable binder, as tar, and formed by pressure or otherwise into the desired shape and baked in the usual manner. When it is desired that the carbon-article shall be in the form of a graphite article, as for instance in making electrodes, said article can first be converted into graphite in accordance with my Patent No. 702,758 of June 7, 1902, or the article may be formed in the first instance of graphite and molded or formed into the desired shape. The carbon-article being thus, or in any similar manner, formed, is subjected to the action of silica or silicon and oxygen, and this may be accomplished in various ways, and preferably I embed the formed articles in a mass of silica or a mixture containing silica and carbon, and then expose the same to the proper degree of heat.

When the article is embedded in silica alone and subjected to the requisite heat the silica is partially reduced and combines with some of the carbon of the article so as to form a coating of siloxicon, but in this process I have found some difficulty in operation owing to the difficulty arising in removing the article from the fused mass of silica at the end of the operation. I therefore prefer to embed the article in a mass or mixture containing silica and carbon preferably in about the proportions usually employed in the manufacture of siloxicon in accordance with my previous patent, above referred to.

While I have found that a considerable range in the proportion of the silica and carbon may be practiced, I have obtained good results from a mixture of silica and carbon in the proportions of $2(SiO_2)+C_5$, and when this mixture is used and the mass subjected to the requisite heat, the articles are coated with siloxicon supposedly formed by the combination of some of the silicon and oxygen of the silica and some of the carbon of the article itself, while it is surrounded by a mass of siloxicon formed by the reduction of the silica and the reactions substantially as set forth in my prior patent.

What I claim is,—

1. As a new article of manufacture, a shaped carbon-containing article having a coating of siloxicon.

2. As a new article of manufacture, a shaped graphite electrode having a coating of siloxicon.

3. As a new article of manufacture, a shaped carbon-containing article, a portion of the carbon of which is combined with silicon and oxygen to form a coating of siloxicon.

4. As a new article of manufacture a shaped carbon containing article, the outer portion of which is composed of siloxicon which decrementally merges into the core.

In testimony whereof I affix my signature in presence of two witnesses.

EDWARD GOODRICH ACHESON.

Witnesses:
FLORENCE M. KYSOR,
KATHARINE HAMILTON.